United States Patent [19]

Macomber

[11] Patent Number: 5,005,653
[45] Date of Patent: Apr. 9, 1991

[54] HOE ATTACHMENT FOR A LINE TRIMMER

[76] Inventor: Lance R. Macomber, #110184 Royal, Palm Beach, Fla. 33411

[21] Appl. No.: 226,451

[22] Filed: Aug. 1, 1988

[51] Int. Cl.$^5$ ............................................. A01B 1/10
[52] U.S. Cl. .................................... 172/41; 172/111; 172/378; 172/766
[58] Field of Search .................. 172/380, 41, 37, 110, 172/111, 765, 766, 378, 379, 49.5, 42, 28, 522, 523

[56] References Cited

U.S. PATENT DOCUMENTS

| | | | |
|---|---|---|---|
| 941,589 | 11/1909 | Roper | 172/25 |
| 3,129,772 | 4/1964 | Anderson | 172/111 X |
| 3,814,189 | 6/1974 | Thompson | 172/111 X |
| 4,501,332 | 2/1985 | Straayer | 172/41 |

FOREIGN PATENT DOCUMENTS

| | | | |
|---|---|---|---|
| 0442799 | 4/1926 | Fed. Rep. of Germany | 172/523 |
| 1045698 | 12/1958 | Fed. Rep. of Germany | 172/42 |
| 6410908 | 9/1964 | Netherlands | 172/49.5 |

Primary Examiner—Richard J. Johnson
Assistant Examiner—Jeffrey L. Thompson

[57] ABSTRACT

A hoe attachment for a conventional rotary line trimmer designed to cultivate soil when rotated and which is particularly useful for cultivating small areas of soil. The attachment comprises a plurality of downwardly extending arms each having a blade projection at the lower end thereof extending radially inwardly toward the vertical axis of rotation.

2 Claims, 1 Drawing Sheet

HOE ATTACHMENT FOR A LINE TRIMMER

BACKGROUND—FIELD OF INVENTION

This invention relates to cultivating and aerating of soil, especially with power operated cultivating devices.

BACKGROUND—DESCRIPTION OF PRIOR ART

Many, if not all gardeners, use some means of cultivating soil, either with man powered tools or tools powered by other means. One such motor driven cultivator has a plurality of spine like objects that rotate in an up and down motion. This method usually works in cooperation with a transmission device, is heavy and cumbersome and has extreme difficulty in reaching smaller landscaped areas without damaging desired plants.

OBJECTS AND ADVANTAGES

One object of my invention is to provide a power operated means of cultivating soil.

Another object of my invention is to provide a motor driven cultivator that is light weight and compact to enable use of the cultivator to be as physically unstrenuous as possible.

Another object of the present invention is to provide an efficient way of cultivating soil effectively in areas of limited space without damaging desired plants or objects.

A further object of the present invention is to provide a cultivating device that is easily transitioned from on and off of an existing motor driven shaft so as to give the shaft versatility from its would be limited existing functions.

Readers will find further objects and advantages of hoe attachment from a consideration of the following description and the accompanying drawing.

PREFFERED EMBODIMENT

Figure 1:
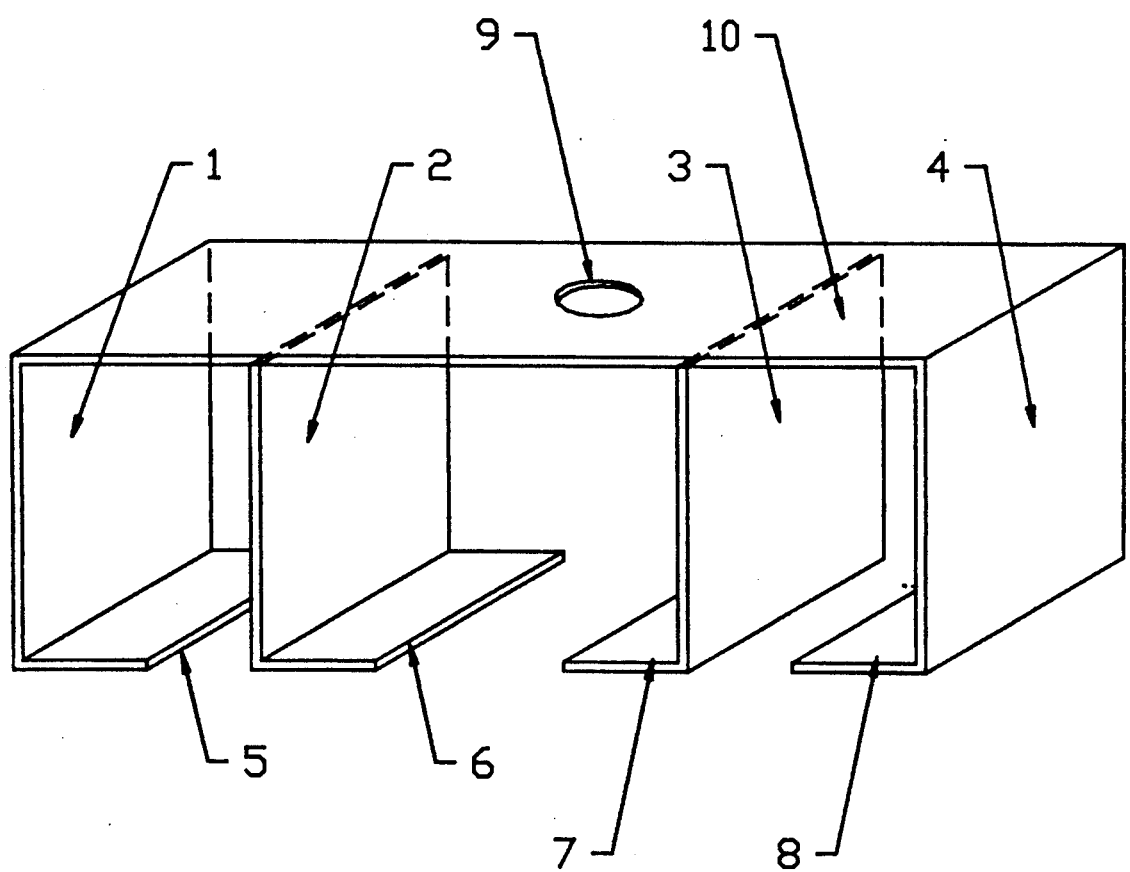
FIG. 1 is a perspective view of a hoe attachment in accordance with the present invention.

The preffered embodiment of the hoe attachment is shown in FIG. 1. This attachment is designed to fit a wide range of line trimmers on the market today. It can be applied to the line trimmer in place of the line trimmer head. The attachment can be secured for operation with the bolt and washer devices supplied with the line trimmer. The attachment will increases versatility of the extremely limited existing line trimmers and may be added to or removed from an existing line trimmer as easily as changing the line trimmer head.

DESCRIPTION OF THE INVENTION

The present invention is directed to an apparatus to be attached to an existing motor driven shaft having a primary function other than cultivating soil, such as a conventional line trimmer.

The present invention will now be described by reference to FIG. 1 and the embodiment shown therein. The hoe attachment comprises a horizontally disposed structural device or hub plate 10 formed of a piece of generally flat material. An arbor hole or aperture 9 extends through the center of the hub plate 10 for providing a means of connecting the attachment to a motor driven shaft. A threaded stud or other functionally equivalent means also could be used in plate of the aperture 9.

A pair of vertically disposed arms 2 and 3 are fixed to the hub plate 10 and extend downwardly therefrom on each side of the aperture 9. An identical second pair of vertically disposed arms 1 and 4 are fixed to the outer ends of the hub plate 10 and extend downwardly therefrom. Each arm is formed of a piece of generally flat material.

A blade means 5, 6, 7 and 8 is provided for each arm 1, 2, 3 and 4, respectively. The blade means are fixed to the lower end of the arms and project radially inwardly toward the center aperture in a generally horizontal plane. Each blade means is formed of a piece of generally flat material.

All components of this hoe attachment are of sufficient strength, size, and material so as to perform their operative functions effectively.

Those skilled in the art will find other embodiments, configurations and uses for the hoe attachment, however the result will still be a device rotated by a motor so as to cultivate or mix various substances. The hoe attachment could be used in cooperation with a gear reducer or other transmission device.

EXAMPLE

A common product that the hoe attachment can be easily attached to is a line trimmer used in lawn maintenance. The hoe attachment is attached to the line trimmer by removing the head that contains line and by securing the hoe attachment in place thereof by use of a bolt and washer that are supplied with the line trimmer. When the hoe attachment is safely secured on the power driven shaft, it is ready to perform its function. The hoe attachment is rotated at a speed sufficient enough to generate adequate power to cultivate soil. When the hoe attachment is pressed into the soil, the soil is cultivated as the hoe attachment rotates. The hoe attachment will cultivate the soil to a regulated and controlled depth as determined by the hoe attachment and the user.

What I claim is:

1. A tillage tool for use as an attachment to a hand held rotary line trimmer, comprising a generally flat horizontally disposed elongate hub plate having an attachment means at the center thereof for attachment to a vertically disposed driven shaft, at least two radially spaced arms on each side of the center, fixed to said hub plate and disposed vertically downwardly therefrom, and a generally flat blade means mounted at the lower end of each arm, said blade means projecting radially inwardly in a generally horizontal plane.

2. A tillage tool according to claim 1, wherein the center attachment means comprises an aperture through the center of said hub plate for attachment by a bolt to said driven shaft.

* * * * *